United States Patent Office 3,433,786
Patented Mar. 18, 1969

3,433,786
6-METHYLSULFONYLANDROSTENES
Vlasios Georgian, 139 Clifton St.,
Belmont, Mass. 02178
No Drawing. Filed Mar. 22, 1967, Ser. No. 625,008
U.S. Cl. 260—239.5  8 Claims
Int. Cl. C07c *173/00*; A61k *17/00*

ABSTRACT OF THE DISCLOSURE

6α-methylsulfonylandrost-4-en-3-ones and 19-nor analogs are prepared by conversion of a testosterone or 19-nortestosterone to an enamine derivative, reaction with methanesulfonyl chloride and acidic hydrolysis of the enamine. The compounds have antiandrogenic activity.

This invention relates to steroid compounds having hormonal activity. In particular, the invention relates to 6-methylsulfonylandrostenes and to intermediates therefor.

The compounds of the invention are represented by the following structural formula:

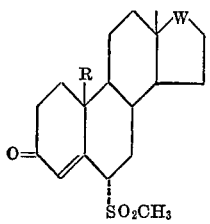

wherein:

W is

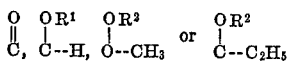

R is hydrogen or methyl;
R¹ is hydrogen, carboxylic acyl having up to about 6 carbon atoms, 2-tetrahydropyranyl, or 1-cyclopentenyl; and
R² is hydrogen or carboxylic acyl having up to about 6 carbon atoms.

Among the groups intended to be included within the definition of "carboxylic acyl" are acetyl, propionyl, butyryl, caproyl, valeryl, and benzoyl.

The compounds of the present invention are prepared by insertion of the methylsulfonyl group at the 6-position with methanesulfonyl chloride in the presence of a base such as triethylamine. For the purpose of this reaction the 3-keto group is converted to an enamine, and methanesulfonyl chloride is allowed to react with the resulting 3-pyrrolidino-3,5-diene. The compounds with particular desired groups at the 17α-position are generally obtained by utilizing as starting materials those compounds already having such groups. As indicated above, 17-hydroxy compounds are best prepared by use of a 17-ester, which is ultimately hydrolyzed to the free alcohol. A 17-tetrahydropyranyl or cyclopentenyl ether is obtained by reaction of dihydropyran or a cyclopentanone ketal in the presence of an acid catalyst such as p-toluenesulfonic acid.

Also considered part of the invention are the intermediate 6-methylsulfonyl-3-pyrrolidino-3,5-dienes having the following structural formula:

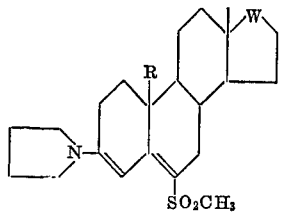

where:

W is

or

R is hydrogen or methyl;
R¹ is hydrogen, carboxylic acyl having up to about 6 carbon atoms, 2-tetrahydropyranyl, or 1-cyclopentenyl; and
R² is hydrogen or carboxylic acyl having up to about 6 carbon atoms.

The compounds of the invention are useful either as antiandrogenic agents or as intermediates for preparing the product antiandrogenic agents. The compounds having a 17-keto or 17-alcohol group, or the etherified derivatives thereof, possess antiandrogenic activity, whereas the 17-esters are useful for preparing these compounds.

The preferred compounds of the invention, 6α-methylsulfonylandrost-4-ene-3,17-dione and 6α-methylsulfonyl-17β-hydroxyandrost-4-en-3-one, have been found to possess antiandrogenic activity in rats when administered subcutaneously at doses of 20–80 mg./kg. The former compound also possesses natriuretic activity.

The compounds of the invention are formulated according to standard techniques of pharmaceutical chemistry for use in those instances where it is desired to counteract the effects of hyperandrogenicity. Oral dosage forms such as tablets and capsules, as well as injectable formulations and topical creams may be prepared.

The following examples are intended to illustrate the preparation of the compounds of the invention, but are not to be construed as limiting the scope thereof. All temperatures are in degrees centigrade.

EXAMPLE 1

6α-methylsulfonyl-17β-hydroxyandrost-4-en-3-one

To a hot solution of 25 g. of testosterone acetate in a mixture of 250 ml. of absolute ethanol and 10 ml. of methylene chloride is added in 1 portion 25 ml. of pyrrolidine, and the reaction mixture is heated on the steam bath for 2 minutes. The mixture is then cooled to room temperature and maintained there for 1 hour, and the resulting precipitate of 17β-acetoxy-3-pyrrolidinoandrosta-3,5-diene filtered off and washed with either; M.P. 165–167°; IR(CHCl₃) 5.82, 6.15, 6.26, 8.05, 9.72μ. This compound is unstable and is kept in the refrigerator under nitrogen prior to use.

To a stirred room temperature solution of 26.6 g. of the above enamine in 160 ml. of benzene is added dropwise under nitrogen a solution of 10.5 ml. of distilled triethylamine in 10 ml. of benzene. After 10 minutes, a solution of 5.6 ml. of distilled methanesulfonyl chloride in 75 ml. of benzene is added dropwise and the mixture stirred under nitrogen for 16 hours and then filtered. The filtrate is diluted with 200 ml. of ether and then washed with water, dried, and evaporated. The residue is dissolved in methanol and crystallized in the cold. The resulting precipitate, M.P. 195–215 dec., is chromatographed on 180 g. of Florisil 60/100 and the fractions eluted with 10% methanol-90% ether combined and evaporated. The residue is crystallized and recrystallized from methanol to give 6 - methylsulfonyl - 17β - acetoxy - 3 - pyrrolidinoandrosta-3,5-diene, M.P. 225–226° dec. IR (Nujol) 5.85, 6.4, 7.35, 8.1, 9.05, 10.65, 12.12μ UV (95% $C_2H_5OH$) 340 mμ.

A mixture of 1.0 g. of the above methylsulfonyl enamine, 4 g. of sodium acetate, 4 ml. of glacial acetic acid, 10 ml. of water, and 50 ml. of absolute methanol is refluxed under nitrogen for 4 hours. The solvent is evaporated in vacuo and the residue dissolved in a mixture of chloroform and water. The aqueous layer is extracted with chloroform and the combined chloroform extracts washed successively with water, $NaHCO_3$, cold dilute HCl, and water, dried, and evaporated. The residue is crystallized from acetate to give 6α-methyl-sulfonyl-17β-acetoxyandrost-4-en-3-one, M.P. 255–256° dec. IR ($CHCl_3$) 5.78, 5.95, 6.22, 7.98, 8.85, 9.15, 10.5μ.

A mixture of 2.5 g. of the above acetate, 200 ml. of methanol, 50 ml. of water, and 2.5 g. of $NaHCO_3$ is refluxed with stirring for 3 hours. The mixture is filtered, the filtrate is acidified with acetic acid, and then evaporated until precipitation occurs. Water is added, the precipitate is filtered off, washed with water, dried, and crystallized from methylene chloride-acetone or from acetone to give the title product, M.P. 265–266°.

EXAMPLE 2

6α-methylsulfonylandrost-4-ene-3,17-dione

To a hot solution of 20 g. of androst-4-ene-3,17-dione in 80 ml. of methanol is added in 1 portion 8 ml. of pyrrolidine. The mixture is stirred well and kept at room temperature for 2 hours, after which time the resulting crystals of 3-pyrrolidinoandrosta-3,5-dien-17-one are filtered off, washed well with cold methanol, dried, and recrystallized from acetone and methylene chloride; M.P. 215–216° dec. IR ($CHCl_3$) 5.80, 6.18, 6.28μ. UV ($CHCl_3$) 278 mμ.

To a stirred solution of 6.8 g. of the above enamine in 175 ml. of dry benzene under nitrogen is added a solution of 3.1 ml. of triethylamine in 15 ml. of dry benzene. After 5 minutes, a solution of 1.6 ml. of methanesulfonyl chloride in 10 ml. of dry benzene is added dropwise under nitrogen and the reaction mixture is then stirred at room temperature for an additional hour and filtered. The filtrate is washed successively with water, $NaHCO_3$ solution, and water, dried and evaporated to give 6-methylsulfonyl-3-pyrrolidinoandrosta-3,5-dien-17-one.

A mixture of 7 g. of the above 6-methylsulfonyl enamine, 28 g. of sodium acetate, 28 ml. of glacial acetic acid, 70 ml. of water, and 350 ml. of methanol under nitrogen is refluxed on the steam bath for 4½ hours. The solvent is evaporated in vacuo and the residue dissolved in water and a mixture of ether and methylene chloride (the organic layer being lighter than water). The organic layer is washed successively with water, dilute HCl, and water, and then dried and evaporated. The residue is dissolved in the minimum amount of acetone, diluted with n-hexane, and cooled. The resulting crystals of the title product are recrystallized from acetone; M.P. 243–244° dec. IR ($CHCl_3$) 5.85, 6.06, 6.35, 7.7, 8.92, 10.55μ.

EXAMPLE 3

When an equivalent amount of 17α-methyltestosterone acetate or 17α-ethyltestosterone acetate are substituted for the testosterone acetate of Example 1 and the enamine formation, condensation with methanesulfonyl chloride, and acidic hydrolysis carried out as described therein, the intermediates 6α-methylsulfonyl-17α-methyl-17β-acetoxyandrost-4-en-3-one or 6α-methylsulfonyl-17α-ethyl-17β-acetoxyandrost-4-en-3-one, respectively, are obtained. Basic hydrolysis as in Example 1 gives 6α-methylsulfonyl-17α-methyl- or ethyl-17β-hydroxyandrost-4-en-3-one.

When propionate, butyrate, valerate, caproate, or other similar esters are used as starting materials, the corresponding 6-methylsulfonyl 17-propionate, butyrate, valerate, or caproate, or other ester intermediates are obtained respectively. They are hydrolyzed to the corresponding 17-alcohol products.

When 19-nortestosterone acetate or 17α-methyl-19-nortestosterone acetate are used as starting materials, the intermediates 6α-methylsulfonyl-17β-acetoxy - 19 - norandrost-4-en-3-one and 6α-methylsulfonyl-17α-methyl-17β-acetoxy-19-norandrost-4-en-3-one and ultimately the products 6α-methylsulfonyl-17β-hydroxy - 19-norandrost-4-en-3-one and 6α-methylsulfonyl-17α - methyl-17β-hydroxy-19-norandrost-4-en-3-one, respectively are obtained.

EXAMPLE 4

6α-methylsulfonyl-17β-(2-tetrahydropyranyloxy)androst-4-en-3-one

A mixture of 1 g. of 6α-methylsulfonyl-17β-hydroxyandrost-4-en-3-one, an excess of dihydropyran, and a catalytic amount of p-toluenesulfonic acid in benzene is refluxed for a short period of time. The resulting solution is diluted with benzene, extracted with 5% $NaHCO_3$ solution and then water, dried and evaporated to give the title product.

EXAMPLE 5

6α-methylsulfonyl-17β-(1-cyclopentenyloxy)androst-4-en-3-one

A mixture of 2 g. of 6α-methylsulfonyl-17β-hydroxyandrost-4-en-3-one, 5 ml. of cyclopentanone diethyl ketal, and a catalytic amount of p-toluenesulfonic aicd is placed in a flask with a water trap and heated at 150–175° (bath temperature) until no more distillation occurs. The residue is cooled and diluted with aqueous methanol, and the title product obtained upon cooling, evaporation, or extraction with ether.

I claim:
1. A compound of the formula

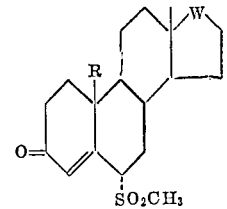

wherein:
W is

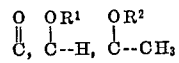

or

R is hydrogen or methyl;
$R^1$ is hydrogen, carboxylic acyl having up to about 6 carbon atoms, 2-tetrahydropyranyl, or 1-cyclopentenyl; and
$R^2$ is hydrogen or carboxylic acyl having up to about 6 carbon atoms.

2. A compound as claimed in claim 1, where R is methyl.

3. A compound as claimed in claim 2, where W is $$\overset{O}{\underset{}{\overset{\|}{C}}}$$

being the compound 6α-methylsulfonylandrost-4-ene-3,17-dione.

4. A compound as claimed in claim 2, where W is $$\overset{OR^1}{\underset{}{\overset{|}{C}\text{--H}}}$$

5. A compound as claimed in claim 4, where $R^1$ is hydrogen, being the compound 6α-methylsulfonyl-17β-hydroxyandrost-4-en-3-one.

6. A compound of the formula

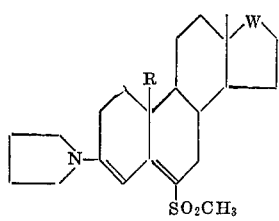

where W is $$\overset{O}{\underset{}{\overset{\|}{C}}},\ \overset{OR^1}{\underset{}{\overset{|}{C}\text{--H}}},\ \overset{OR^2}{\underset{}{\overset{|}{C}\text{--CH}_3}}$$

or $$\overset{OR^2}{\underset{}{\overset{|}{C}\text{--C}_2\text{H}_5}}$$

R is hydrogen or methyl;
$R^1$ is hydrogen, carboxylic acyl having up to about 6 carbon atoms, 2-tetrahydropyranyl, or 1-cyclopentenyl; and
$R^2$ is hydrogen or carboxylic acyl having up to about 6 carbon atoms.

7. A compound as claimed in claim 6, where W is $$\overset{O}{\underset{}{\overset{\|}{C}}}$$

and R is methyl, being the compound 6-methylsulfonyl-3-pyrrolidinoandrosta-3,5-dien-17-one.

8. A compound as claimed in claim 6, where W is $$\overset{OCOCH_3}{\underset{}{\overset{|}{C}\text{--H}}}$$

and R is methyl, being the compound 6-methylsulfonyl-17β-acetoxy-3-pyrrolidinoandrosta-3,5-diene.

References Cited

UNITED STATES PATENTS 2,460,009  1/1949  Huber et al.

LEWIS GOTTS, *Primary Examiner.*

ETHEL G. LOVE, *Assistant Examiner.*

U.S. Cl. X.R.

260—239.55, 397.3, 397.4; 424—241